INVENTOR
SIGMUND KEMMLER

United States Patent Office 3,152,434
Patented Oct. 13, 1964

3,152,434
SPINDLE DRIVING MECHANISM
Sigmund Kemmler, Geislingen an der Steige, Württemberg, Germany, assignor to Wurttembergische Spindelfabrik G.m.b.H., Sussen, Wurttemberg, Germany
Filed Mar. 22, 1961, Ser. No. 97,629
Claims priority, application Germany Mar. 28, 1960
9 Claims. (Cl. 57—105)

The present invention relates to a spindle driving mechanism for the spindles of spinning and twisting machines, in which a belt or cord which drives only an individual spindle passes over a drive pulley on the drive shaft without looping around the same, and then passes over a guide pulley and a tension pulley to and around the whirl of the spindle, and in which the drive shaft and drive pulley are disposed closely adjacent to the spindle. The short drive belt together with the guide pulley, the tension pulley and the drive pulley, as well as the spindle bearing may then be enclosed by a single cover which is preferably secured to the main spindle frame and is either adapted to be opened or to be removed.

It is an object of the present invention to provide a spindle drive of the above-mentioned type with a guide pulley arrangement which renders the driving mechanism especially suitable for driving heavy spindles.

An important feature of the invention consists in mounting the guide pulley so as to be in engagement with the drive pulley and to be driven by the latter. By such an arrangement it is possible to transmit the driving forces through the drive belt in a manner which will reduce the wear of the belt, and in a more powerful and concentrated manner to the whirl of the spindle, especially if the belt rotates in the direction from the drive pulley to the spindle whirl. This driving engagement between the drive pulley and the guide pulley may be improved by providing at least one of these pulleys, preferably the guide pulley, with a friction coating.

These and further objects, features and advantages of the present invention will become more clearly apparent from the following description, particularly when the same is read with reference to the accompanying sheet showing drawings of the invention which, however, are to be merely regarded as illustrative of the principles of the invention and in which—

Figure 1:
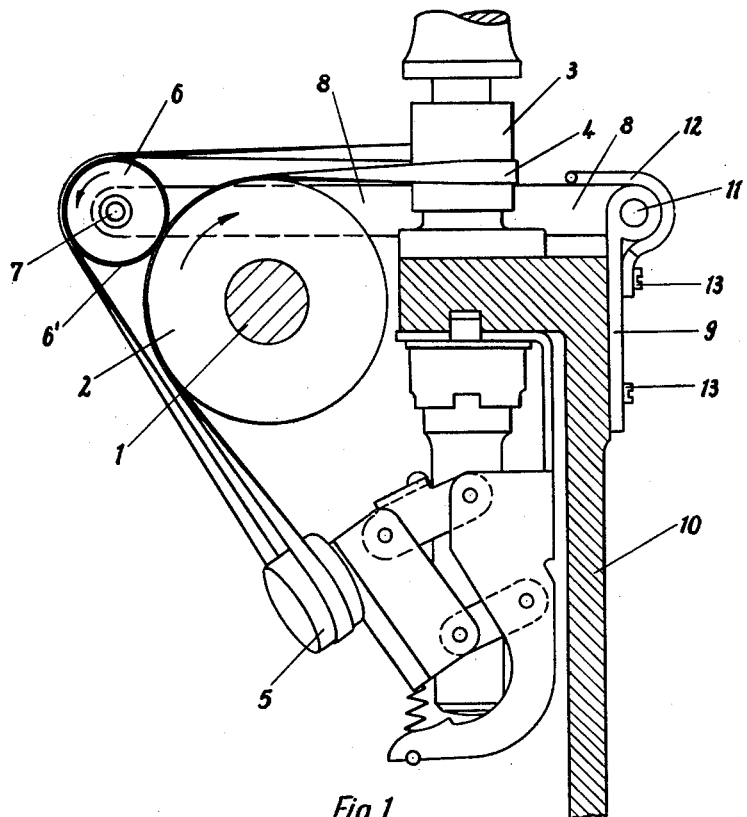
Figure 2:
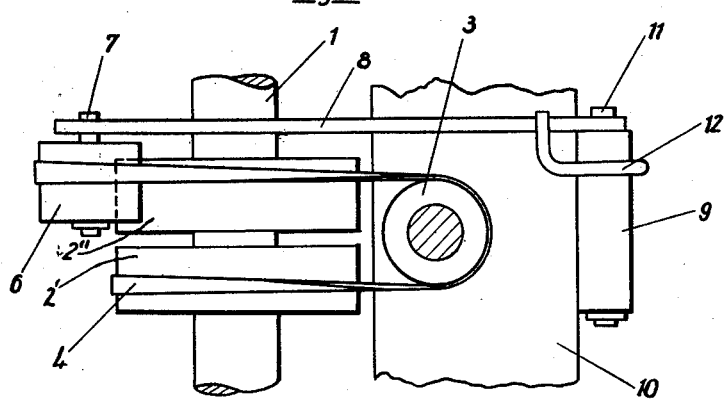

FIGURE 1 shows a side view of a spindle driving mechanism which comprises a guide pulley which is designed in the form of a friction pulley and is driven by the drive pulley; while FIGURE 2 shows a plan view of another embodiment of a spindle driving mechanism according to the present invention.

The spindle driving mechanism as illustrated in FIGURE 1, comprises a drive shaft 1 on which a drive pulley 2 is secured. This drive pulley has a slightly greater width than usual in such spindle driving mechanisms. The spindle whirl 3 is driven by a belt 4 which is illustrated as running to whirl 3 from the drive pulley 2 illustrated as rotating clockwise, over the guide pulley 6, and over the tension pulley 5, and back to the drive pulley 2. The shaft 7 of guide pulley 6 is mounted on one end of a lever 8 which carries on its other end a pin 11. This pin 11 is rotatably mounted in a bearing member 9 which is secured to the main spindle frame 10, for example, by screws 13. Lever 8 is continuously depressed by a spring 12 which is likewise secured to the spindle frame, whereby guide pulley 6 which is provided with a friction coating 6' is pressed against the drive pulley 2. Guide pulley 6 is therefore taken along by drive pulley 2 when the latter rotates, so that the peripheral speed of the guide pulley will be equal to that of the drive pulley. The advantage of driving the guide pulley will be especially apparent when the direction of rotation of the spindle is to be reversed merely by reversing the direction of rotation of the drive shaft, that is, without changing the belt.

The principle of operation of the driving mechanism remains the same even though in place of one common drive pulley 2 for the drive belt and the guide pulley two equally large drive pulleys 2′ and 2″ (FIGURE 2) are provided; pulley 2′ serves for driving the belt and pulley 2″ for driving the guide pulley. In this case, the special drive pulley 2″ for driving the guide pulley may also be provided with a friction coating.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A driving mechanism for the spindles of spinning and twisting machines comprising a frame, an upright spindle rotatably mounted on said frame, a whirl on said spindle, a drive shaft extending at right angles to said spindle, a drive pulley secured to said drive shaft, a guide pulley rotatably mounted on said frame, said drive shaft and drive pulley being disposed closely adjacent to said spindle, a tension pulley also rotatably mounted on said frame, and a belt running over said drive pulley without looping around the same, and then over said spindle whirl, said guide and tension pulleys and back to said drive pulley, said guide pulley being in frictional engagement directly with said drive pulley and adapted to be driven thereby.

2. A driving mechanism for the spindles of spinning and twisting machines comprising a frame, an upright spindle rotatably mounted on said frame, a whirl on said spindle, a drive shaft a drive pulley secured to said drive shaft, a guide pulley rotatably mounted on said frame and in frictional engagement directly with said drive pulley so as to be driven thereby, said drive shaft and drive pulley being disposed closely adjacent to said spindle, a tension pulley also rotatably mounted on said frame, and a belt running over said drive pulley without looping around the same, and then over said spindle whirl, said guide pulley, and said tension pulley back to said drive pulley, said belt being disposed on the surface of said drive pulley laterally adjacent to said guide pulley.

3. A driving mechanism as defined in claim 2, further comprising means for pivotally mounting said guide pulley on said frame, and resilient means for pressing said guide pulley into frictional engagement with said drive pulley.

4. A driving mechanism for the spindles of spinning and twisting machines comprising a frame, an upright spindle rotatably mounted on said frame, a whirl on said spindle, a drive shaft extending at right angles to said spindle, a pair of drive pulleys secured to said drive shaft, a guide pulley rotatably mounted on said frame and in direct frictional engagement with one of said drive pulleys so as to be driven thereby, said drive shaft and drive pulleys being disposed closely adjacent to said spindle, a tension pulley also rotatably mounted on said frame, and a belt running over the other drive pulley without looping around the same, and then over said spindle whirl, said guide pulley, and said tension pulley back to said other drive pulley.

5. A driving mechanism for spindles of spinning and twisting machines comprising a frame, an upright spindle rotatably mounted on said frame, a whirl on said spindle, a drive pulley disposed closely adjacent to said spindle, a guide pulley rotatably mounted on said frame, said guide pulley being in direct frictional engagement with said drive pulley and adapted to be driven thereby, a tension pulley rotatably mounted on said frame, and a belt adapted to be driven by said drive pulley and being in operative engagement with said drive pulley, said spindle whirl, said guide pulley, and said tension pulley.

6. A driving mechanism for the spindles of spinning and twisting machines comprising a frame, an upright spindle rotatably mounted on said frame, a whirl on said spindle, a drive shaft extending at right angles to said spindle, a drive pulley secured to said drive shaft, a guide pulley rotatably mounted on said frame, said drive shaft and drive pulley being disposed closely adjacent to said spindle, a tension pulley also rotataby mounted on said frame, and a belt running over said drive pulley without looping around the same, and then over said spindle whirl, said guide and tension pulleys and back to said drive pulley, said guide pulley being in frictional engagement directly with said drive pulley and adapted to be driven thereby at a point of the circumference of said guide pulley which has the same diameter as the circumference on which the belt runs.

7. A driving mechanism for the spindles of spinning and twisting machines comprising a frame, an upright spindle rotatably mounted on said frame, a whirl on said spindle, a drive shaft, a drive pulley secured to said drive shaft, a guide pulley rotatably mounted on said frame, said drive shaft and drive pulley being disposed closely adjacent to said spindle, a tension pulley also rotatably mounted on said frame, and a belt running over said drive pulley without looping around the same, and then over said spindle whirl, said guide pulley, and said tension pulley back to said drive pulley, said guide pulley being in frictional engagement directly with said drive pulley so as to be driven thereby at a point of the circumference of said drive pulley which has the same diameter as the circumference on which the belt runs.

8. A driving mechanism for the spindles of spinning and twisting machines comprising a frame, an upright spindle rotatably mounted on said frame, a whirl on said spindle, a drive shaft extending at right angles to said spindle, a pair of drive pulleys secured to said drive shaft, a guide pulley rotatably mounted on said frame, said drive shaft and drive pulleys being disposed closely adjacent to said spindle, a tension pulley also rotatably mounted on said frame, and a belt running over one of said drive pulleys without looping around the same, and then over said spindle whirl, said guide pulley, and said tension pulley back to said one drive pulley, said guide pulley being in direct frictional engagement with the other of said drive pulleys so as to be driven thereby at a point of the circumference of said guide pulley which has the same diameter as the circumference on which the belt runs.

9. A driving mechanism for spindles of spinning and twisting machines comprising a frame, an upright spindle rotatably mounted on said frame, a whirl on said spindle, a drive pulley disposed closely adjacent to said spindle, a guide pulley rotatably mounted on said frame, a tension pulley rotatably mounted on said frame, and a belt adapted to be driven by said drive pulley and being in operative engagement with said drive pulley, said spindle whirl, said guide pulley, and said tension pulley, said guide pulley being in direct frictional engagement with said drive pulley and adapted to be driven thereby at a point of the circumference of said guide pulley which has the same diameter as the circumference on which the belt runs.

References Cited in the file of this patent

UNITED STATES PATENTS

| 1,148,383 | Henry | July 27, 1915 |
| 2,549,038 | Zenner | Apr. 17, 1951 |
| 3,025,658 | Steichele et al. | Mar. 20, 1962 |
| 3,035,400 | Stahlecker | May 22, 1962 |

FOREIGN PATENTS

| 718,717 | France | Nov. 5, 1931 |
| 304,061 | Great Britain | Jan. 17, 1929 |